(12) United States Patent
Yoshigi (10) Patent No.: US 6,429,379 B1
(45) Date of Patent: Aug. 6, 2002

(54) INSULATING SUPPORT OF JUNCTION BOX

(75) Inventor: Toshimasa Yoshigi, Shizuoka (JP)

(73) Assignee: Yazaki Corporation, Tokyo (JP)

(*) Notice: Subject to any disclaimer, the term of this patent is extended or adjusted under 35 U.S.C. 154(b) by 15 days.

(21) Appl. No.: 09/655,509

(22) Filed: Sep. 5, 2000

(30) Foreign Application Priority Data

Sep. 7, 1999 (JP) .......................................... 11-252519

(51) Int. Cl.⁷ .............................................. H01B 17/16
(52) U.S. Cl. ............... 174/138 E; 174/135; 174/138 R; 248/49
(58) Field of Search ........................ 174/138 E, 65 R, 174/66, 68.3, 72 A, 99 R, 135, 138 R, 154, 168; 248/49; 361/826

(56) References Cited

FOREIGN PATENT DOCUMENTS

JP  04-171688  6/1992

*Primary Examiner*—Dean A. Reichard
*Assistant Examiner*—W. David Walkenhorst
(74) *Attorney, Agent, or Firm*—ARmstrong, Westerman & Hattori, LLP (57) ABSTRACT

An insulating support of a junction box, which enables the so-called cross wiring and secures an insulating performance without changing an external form of the insulating support so as to use a space for disposing the insulating support efficiently, is provided. The insulating support for wiring wires thereon of a junction box provided between a power supply and electric loads includes a pair of ribs 10 formed on the insulating support 11 for holding a first wire 17 and a second wire 16 therebetween, wherein the first wire 17 laid between tops 12 of a pair of the ribs 10 is held crossing over the second wire 16 disposed between a pair of the ribs 10.

7 Claims, 11 Drawing Sheets

INSULATING SUPPORT OF JUNCTION BOX

BACKGROUND OF THE INVENTION

(1) Field of the Invention

This invention relates to an insulating support of a junction box, which supplies a power current to various electric loads through the junction box in which input-side terminals of a wire harness connected to the various electric loads are intensively disposed.

(2) Description of the Related Art

So far, an insulating support of a junction box disposed between a power supply and electric loads has intensively disposed input-side terminals of a wire harness, which is connected to the various electric loads. For example, as for a wire harness connected to various electric loads such as lamps of a lamp assembly, door-window regulators for use in vehicle and the like, input-side terminals thereof are intensively disposed on the insulating support of a junction box and a power supply current is fed from the insulating support to the electric loads through the wire harness.

Figure 12A:
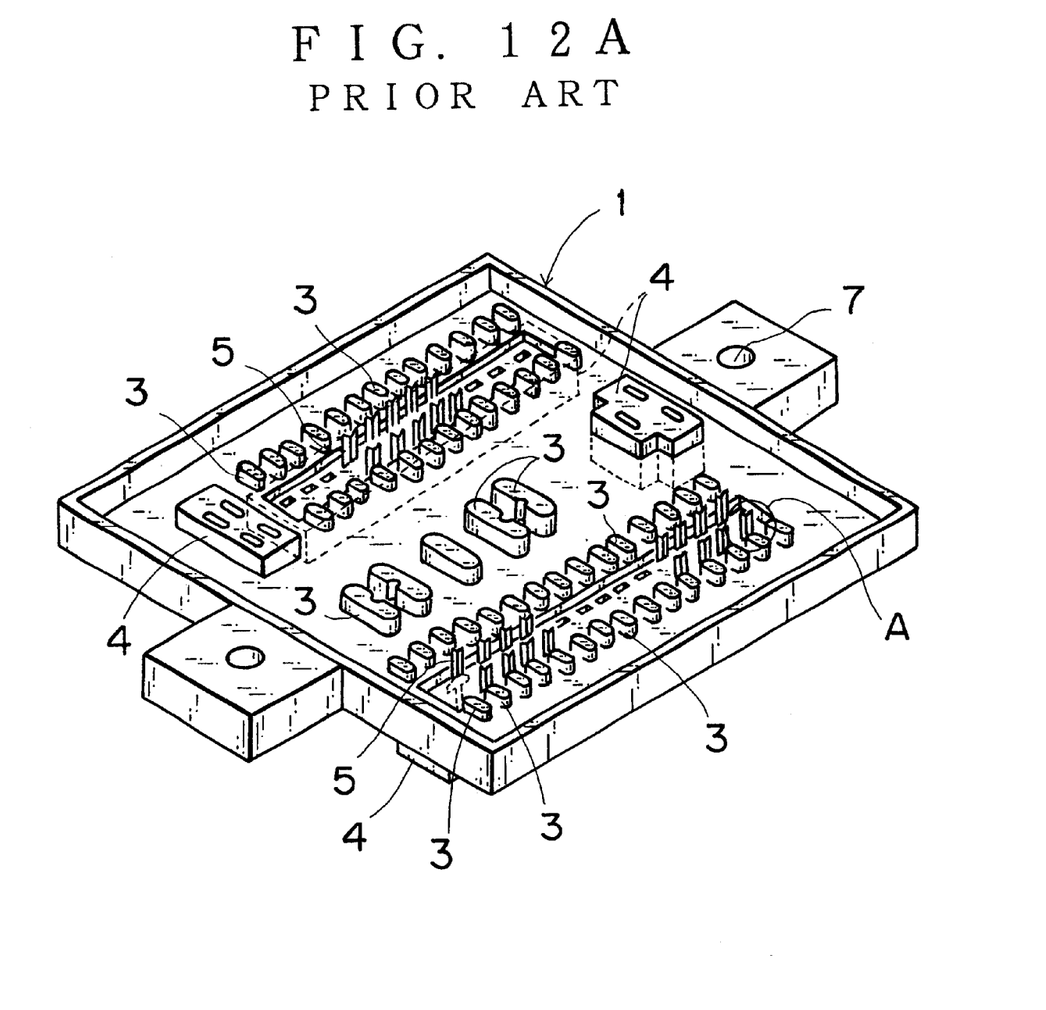
FIG. 12A is a perspective view illustrating a conventional insulating support 1.
Figure 12B:
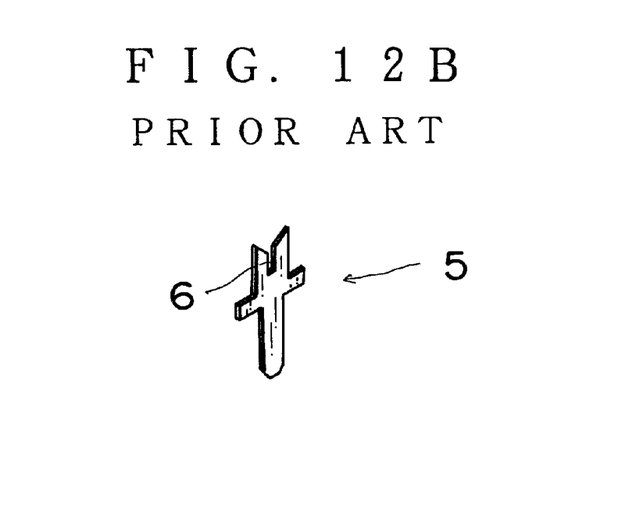
FIG. 12B is an expanded perspective view of a pressure-welding terminal 5 to be inserted into the conventional insulating support 1.

In the following, an example of the insulating support will be explained with reference to FIGS. 12 and 13. The insulating supporting structure consisting of an insulating support 1 (an upper insulating case which is a contour of a junction box) and wires 2 to be wired in an after process is disposed in a limited space such as an engine room, a space under or behind an instrument panel in a cabin and a trunk room.

The insulating support 1 made of synthetic resin is molded into one body containing a plurality of small and large bosses 3 into which wires 2 are press-fitted to be held, a plurality of housings 4 having components such as fuses and connectors therein and the like. A pressure-welding terminal 5 is inserted into the insulating support 1 and each wire 2 is press-fitted into a slit 6 thereof to be held therein, thereby an electric connection is attained by a metalic contact. When the wires 2 are wired to make up the insulating support 1, the insulating support 1 is set on a manufacturing machine by using a positioning hole 7 shown in FIG. 12A.

Figure 13A:
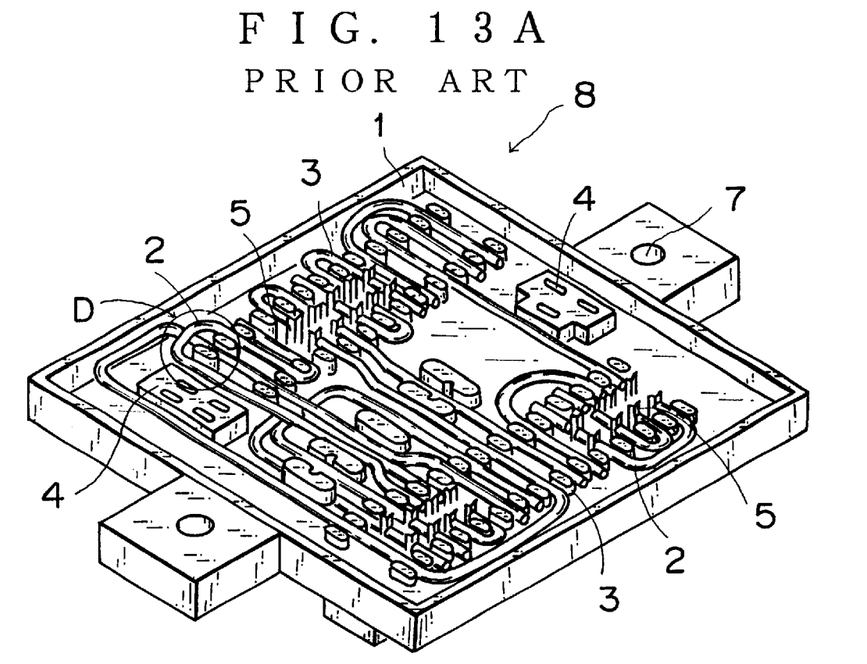
FIG. 13A is a perspective view illustrating a state in which wires 2 are disposed on the conventional insulating support 1.

The wires 2 are wired into the insulating support 1 according to a predetermined wiring pattern by using a known wiring machine described in Japanese Patent Application Laid-Open No. H4-171688, thereby an insulating support 8 shown in FIG. 13A is produced. The wiring can also be carried out by using such a technique that wires fed from an ultrasonic phone nozzle are unitedly welded to the insulating support by melting the insulating support partially or simply by hand.

Upon the wiring, the wire 2 is press-fitted between the bosses 3. Here, as the need arises, projections are formed in advance on the back of an opposite cap member (with respect to the insulating support) to abut on the wires or an adhesive is employed in order to fix the press-fitted wires.

The above measures are taken to prevent the wires 2 from coming off from the space between the bosses 3 by vibrations transmitted to the insulating support upon traveling of the vehicle. If the wire 2 comes off, a shortcircuiting takes place due to a contact between wires or a noise results in a cabin to damage livability thereof.

According to the recent advance in function and in electronics of vehicles, when need to additionally mount lamp units or electric equipments on the vehicle arises, an external size of the insulating support can not be markedly enlarged any more, since a space for disposing the insulating support is limited.

Figure 13B:
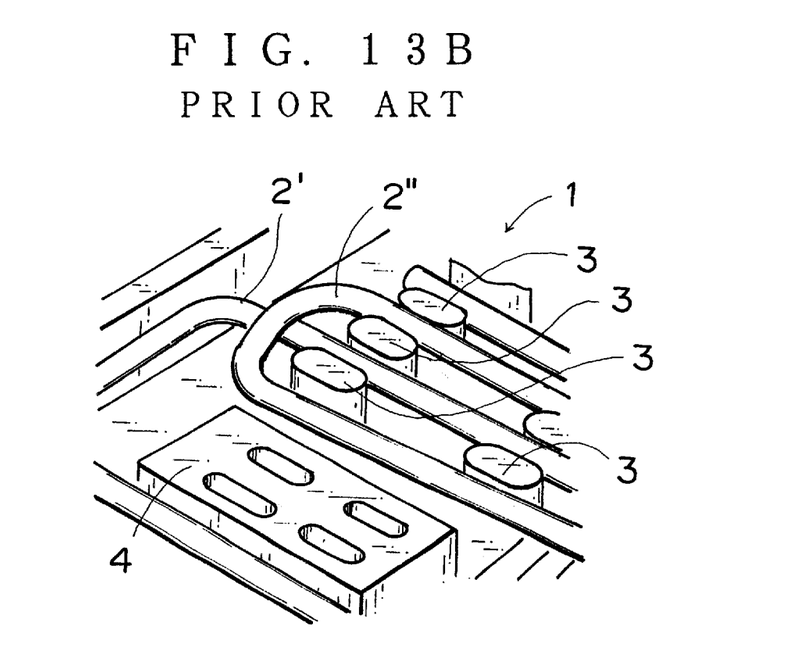
FIG. 13B is an expanded view of a part D in FIG. 13A.

Here, as shown in FIG. 13B, such a design, the so-called cross wiring, can be considered that a first wire 2" straddles a second wire 2' with making a gap therebetween in the insulating support 1.

However, if the wire 2 is not a usual coated wire (insulated wire), but an enameled wire or a bare wire, the wire 2' and wire 2" might contact with each other due to some reason, resulting in that an electric power from a battery might not be stably supplied to electric loads.

SUMMARY OF THE INVENTION

It is therefore an objective of the present invention to solve the above problem and to provide an insulating support of a junction box, which enables the above so-called cross wiring and secures an insulating performance without changing an external form of the insulating support so as to use a space for disposing the insulating support efficiently.

In order to attain the above objective, the present invention is to provide an insulating support for wiring wires thereon of a junction box provided between a power supply and electric loads, comprising a pair of ribs formed on the insulating support for holding a first wire and a second wire therebetween, wherein the first wire laid between tops of a pair of the ribs is held crossing over the second wire disposed between a pair of the ribs.

With the construction described above, the first wire laid between the tops of a pair of the ribs is held in such a manner that the first wire crosses over the second wire which is disposed between a pair of the ribs.

Said each rib has a respective wall faced with each other, a projection is formed on at least one of the walls, and the second wire is press-fitted and held between the projections or between the projection and the opposite wall.

With the construction described above, the projection is formed on at least one of the walls of the rib and the second wire is press-fitted and held between the projections or between the projection and the opposite wall.

A guide channel is formed on said each rib and the first wire to be positioned by the guide channel is laid between the tops of the rib.

With the construction described above, the first wire is positioned on the guide channels formed on a pair of the ribs and laid between the tops of a pair of the ribs.

Said each projection is formed on the respective wall facing with each other.

With the construction described above, since each projection is formed on the respective wall facing with each other, the wiring can be easily implemented.

A spacer is laid between a pair of the ribs so that the spacer prevents the first and second wires from contacting with each other. With the construction described above, since the spacer is laid between a pair of the ribs, the first and second wires never come into contact with each other.

The spacer is formed in such a manner that the first wire laid between the tops of a pair of the ribs can be held to said each rib.

With the construction described above, the spacer prevents the first wire laid between the tops of a pair of the ribs from slipping off, thereby the first wire can be stably held to the ribs.

DESCRIPTION OF THE PREFERRED EMBODIMENTS

In the following, a preferred embodiment of the present invention will be explained in detail with reference to FIGS. 1 to 5.

Figure 1:
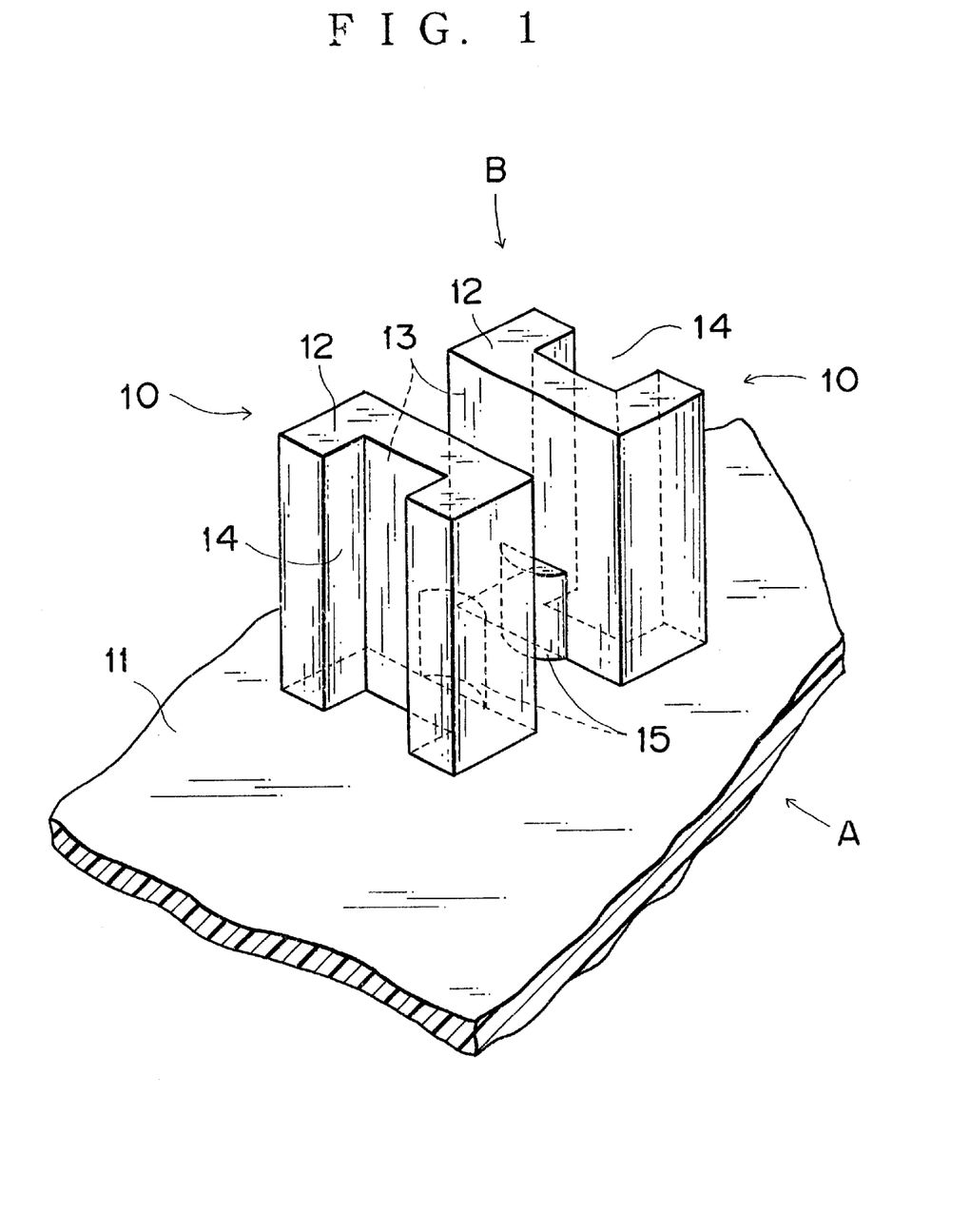
FIG. 1 is an expanded fragmentary perspective view illustrating a basic construction of an insulating support of a junction box according to a preferred embodiment of the present invention.
Figure 2:
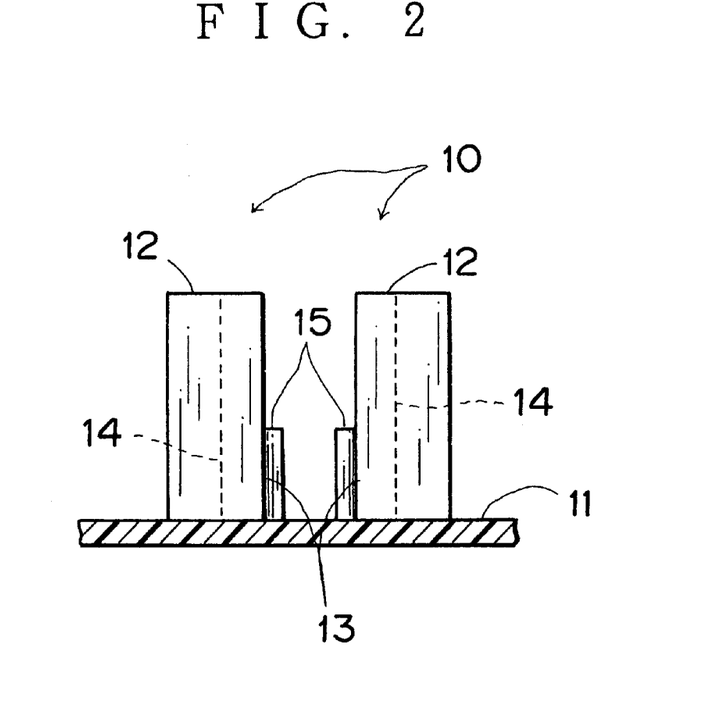
FIG. 2 is a side view viewed from an arrow A in FIG. 1.
Figure 3:
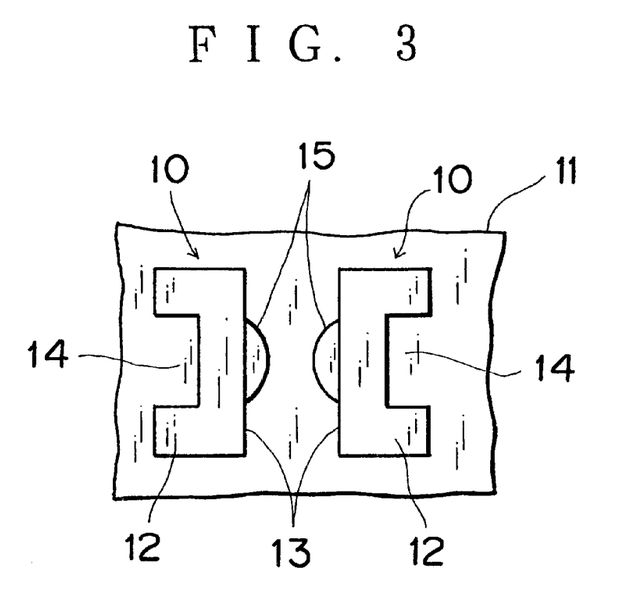
FIG. 3 is a top view viewed from an arrow B in FIG. 1.

Ribs 10 are molded into one body with an insulating support 11 made of synthetic resin. As shown in FIG. 1, a pair of the ribs 10 each has a pillar-shape. As shown in FIGS. 1 to 3, each rib 10 consists of a top 12 having a flat surface, a wall 13, a guide channel 14 having a rectangular shape formed on the opposite side of the wall 13 and a projection 15. The projection 15 having a semicylindrical shape is formed approximately at the center of the lower half of the wall 13. A pair of the rib 10 is diposed symmetrically right and left so as to face the respective walls 13 with each other leaving a predetermined gap therebetween so that a space for wiring can be secured. Each projection 15 faces with the opposite projection 15 in a direction to approach with each other. Each guide channel 14 is also disposed symmetrically right and left. With the construction described above, the predetermined gap between a pair of the walls 13 becomes the shortest at the projection 15. A pair of the ribs 10 having a structure described above is plurally formed at various positions on the insulating support 11 as the need arises.

In the following, a method for wiring wires (bare wires or enameled wires) onto the insulating support 11 in an overhead crossing manner (i.e. the so-called cross wiring) will be explained with reference to FIGS. 4 and 5.

Figure 4:
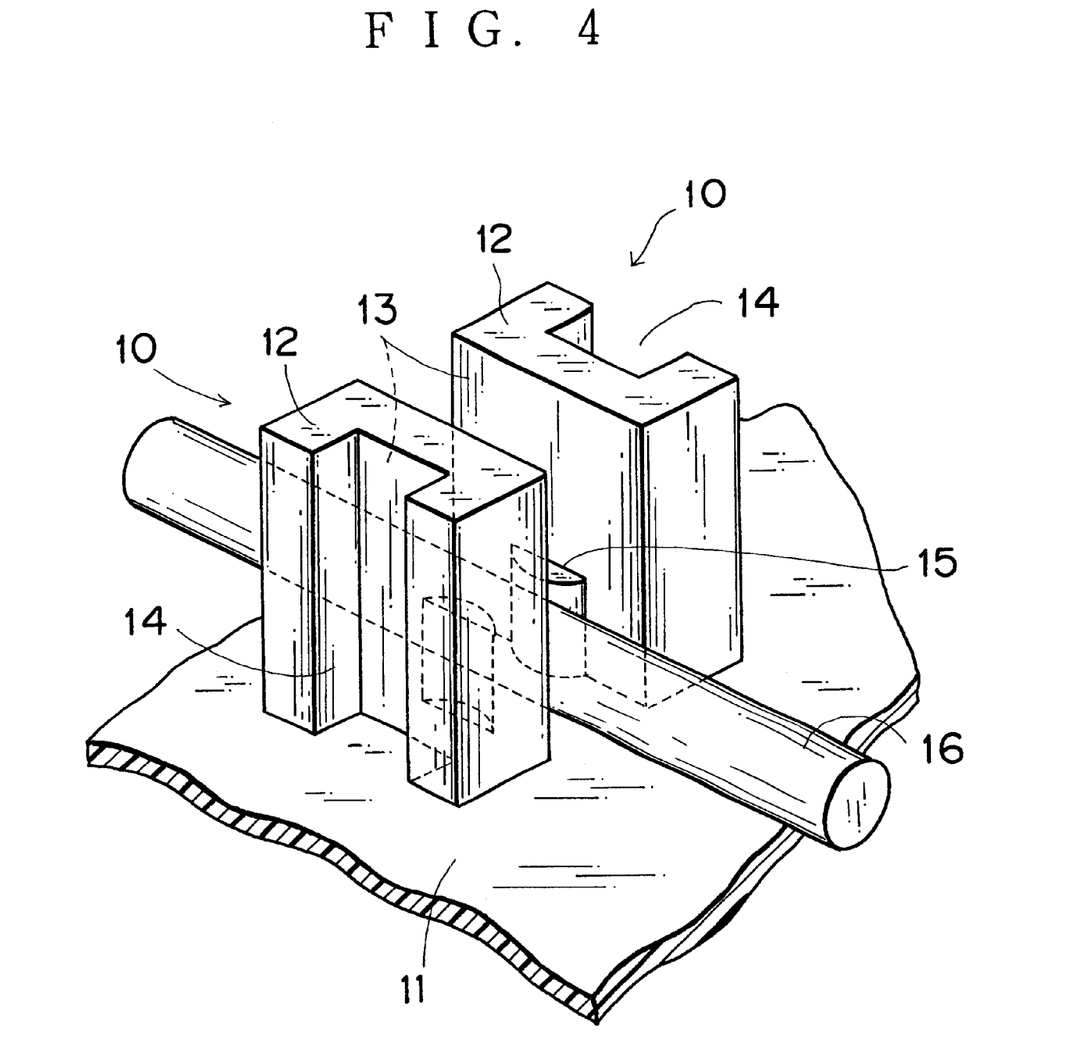
FIG. 4 is a schematic representation illustrating a disposition of a second wire between ribs according to the preferred embodiment.

As shown in FIG. 4, a second wire 16 (underpass wire) is set in the predetermined gap between a pair of the walls 13, then the second wire 16 is press-fitted into the narrow gap between a pair of the projections 15, thereby the second wire 16 is stably held between a pair of the projections 15 and disposed there.

Figure 5:
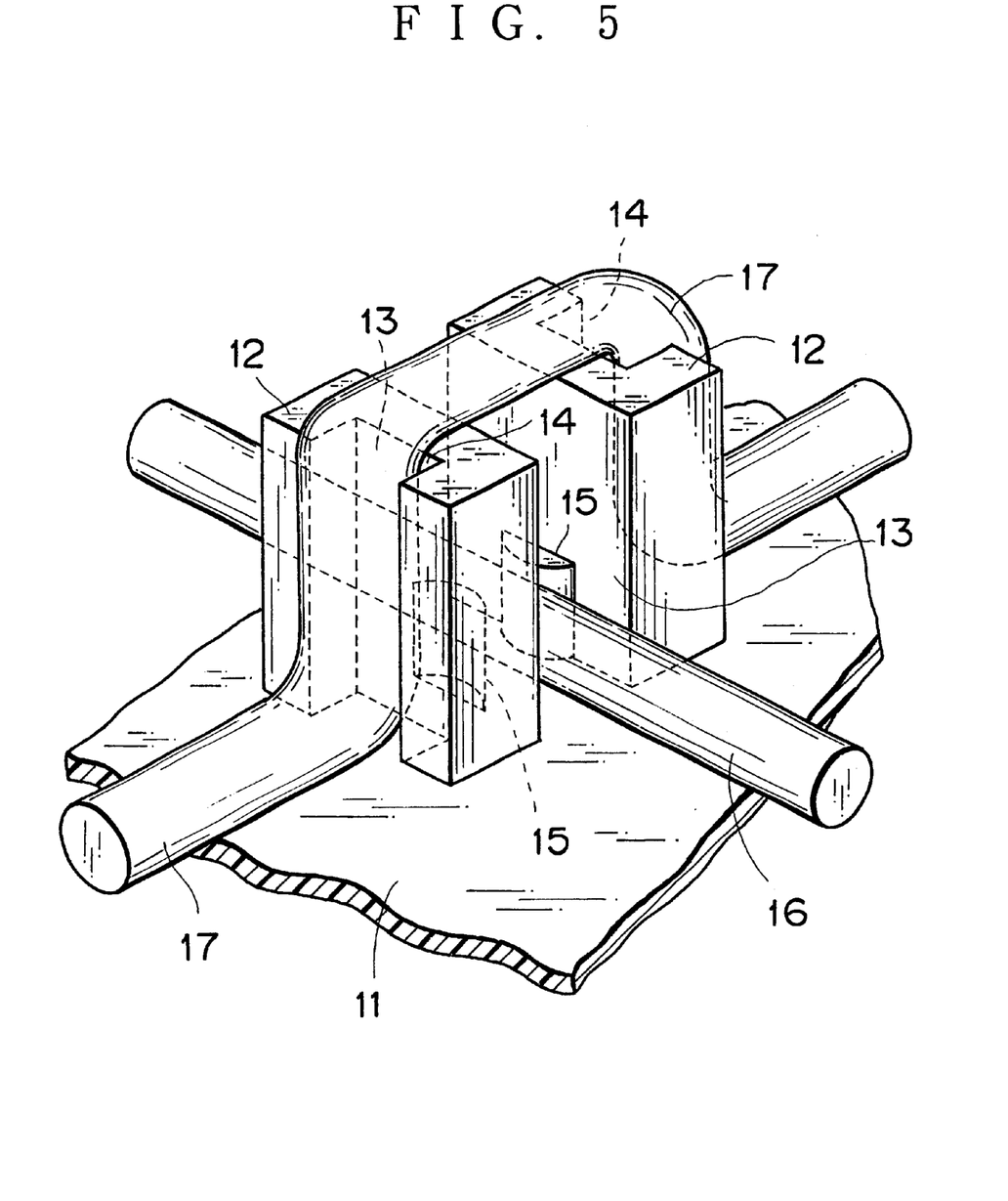
FIG. 5 is a schematic representation illustrating a disposition of a first wire to the ribs shown in FIG. 4.

Then, as shown in FIG. 5, in order to dispose a first wire 17 in a manner of the cross wiring in relation to the second wire 16, the first wire 17 is laid upward along the guide channel 14 of one rib 10 up to the top 12, then laid up to the top 12 of the opposite rib 10 and then, laid downward along the guide channel 14 of the opposite rib 10.

That is, the first wire 17 is disposed (i.e. wired in a manner of the cross wiring) in an inverse U-shape with leaving some gap in relation to the second wire 16.

According to this preferred embodiment, since the second wire 16 is press-fitted between a pair of the projections 15 to be disposed there, the second wire 16 cannot come off from the gap between a pair of the ribs 10 even if an external vibration or force is applied thereto, resulting in keeping reliability of the cross wiring.

The cross wiring mentioned above can be easily implemented since the second wire 16 can be simply press-fitted between a pair of the projections 15 and the first wire 17 can be laid upward along the guide channel 14 of one rib 10 up to the top 12, then laid up to the top 12 of the opposite rib 10 and then, laid downward along the guide channel 14 of the opposite rib 10. That is, the guide channel 14 has functions for positioning and guiding the first wire 17.

Since the first wire 17 is disposed in an inverse U-shape with leaving some gap in relation to the second wire 16, the first wire 17 and the second wire 16 never come into contact with each other. Furthermore, the first wire 17 is held by the guide channel 14 so as not to shift its position, thereby the first wire 17 is prevented from coming off from the top 12 of the rib 10. Therefore, an insulating performance between the first wire 17 and the second wire 16 can be securely maintained.

Figure 6:
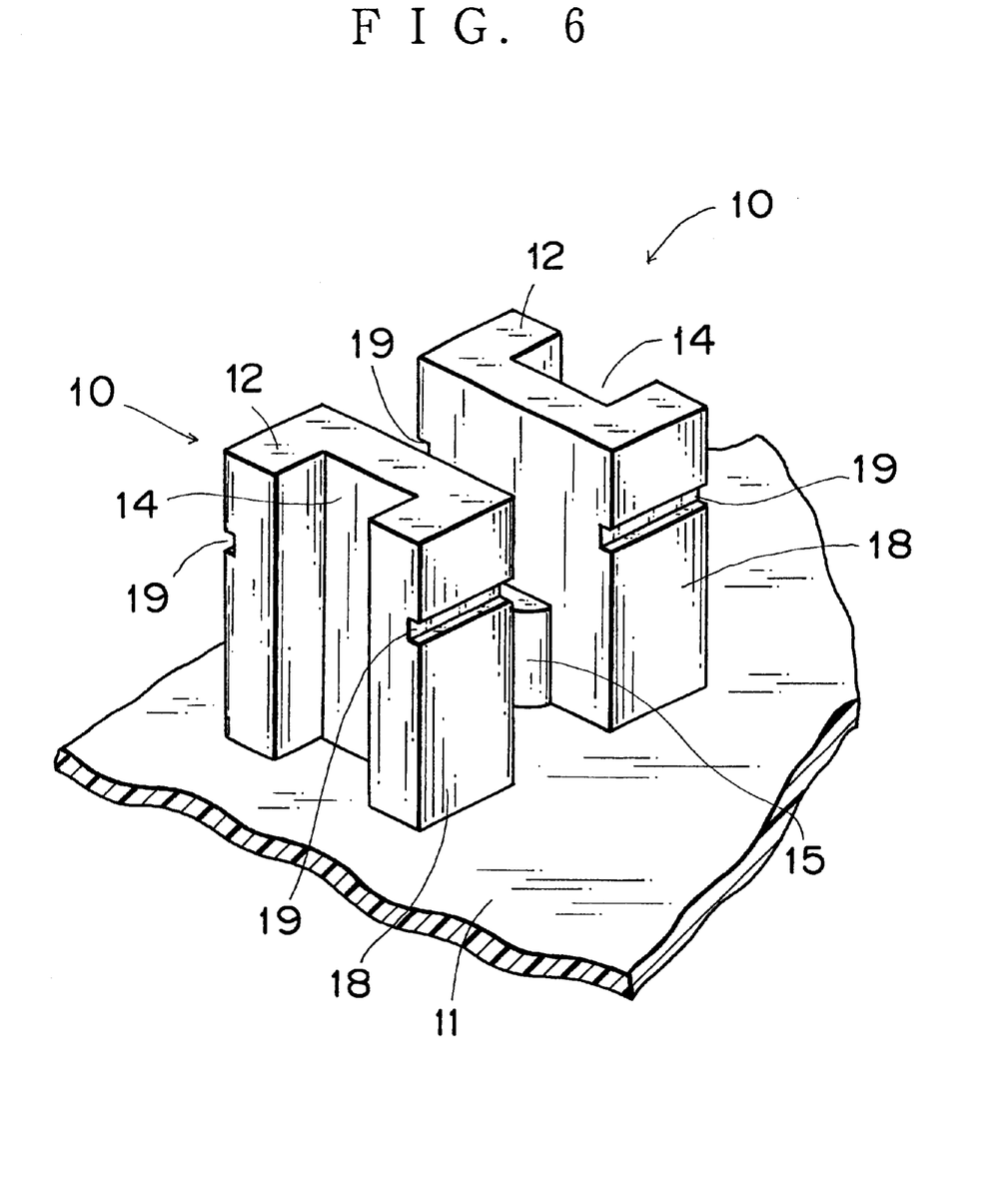
FIG. 6 is an expanded fragmentary perspective view illustrating a basic construction of an insulating support according to a modified preferred embodiment of the present invention.

In the following, a modified preferred embodiment of the present invention will be explained with reference to FIGS. 6 to 8. As shown in FIG. 6, a pair of engaging grooves 19 is formed on side walls 18 of the rib 10 in a horizontal direction thereof. A spacer 20 is covered over a pair of the ribs 10 so as to prevent the first wire 17 and second wire 16 from physically contacting with each other. The spacer 20 is made of electrically insulative synthetic resin and formed to be a box having a cap-shape (see FIGS. 7 and 8), wherein engaging flange 22 is formed at a lower rim of each leg 21 of the spacer 20, which can engage with the engaging grooves 19. When the spacer 20 is attached to a pair of the ribs 10, both legs 21 are expanded into a direction separating from each other against a resilient force which the legs 21 have in nature, then each engaging flange 22 is engaged with the respective engaging grooves 19 and then, the force for expanding both legs 21 is removed. Then, the spacer 20 is firmly fixed to a pair of the ribs 10 by resilience thereof (see FIG. 8).

Figure 7:
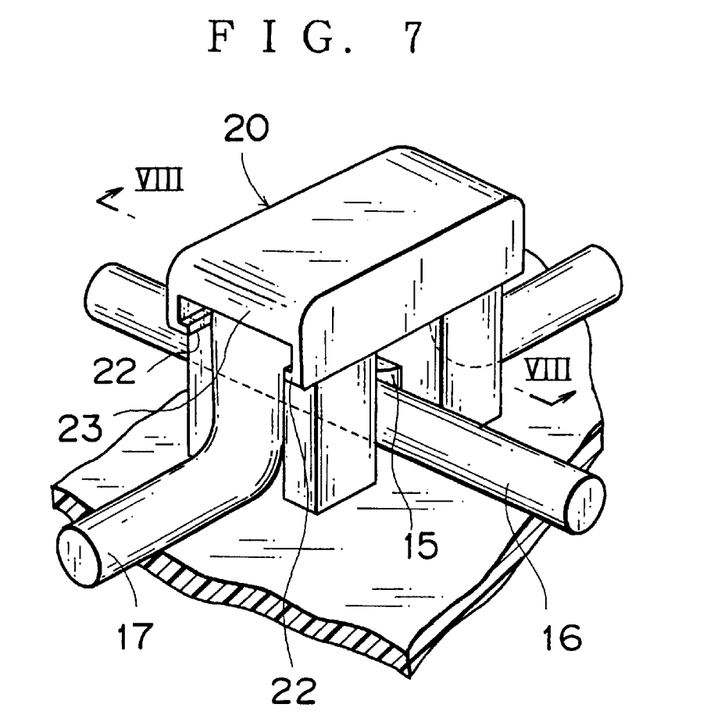
FIG. 7 is an expanded fragmentary perspective view illustrating a state in which a spacer 20 is put on ribs after the first and second wires are disposed to the ribs.
Figure 8:
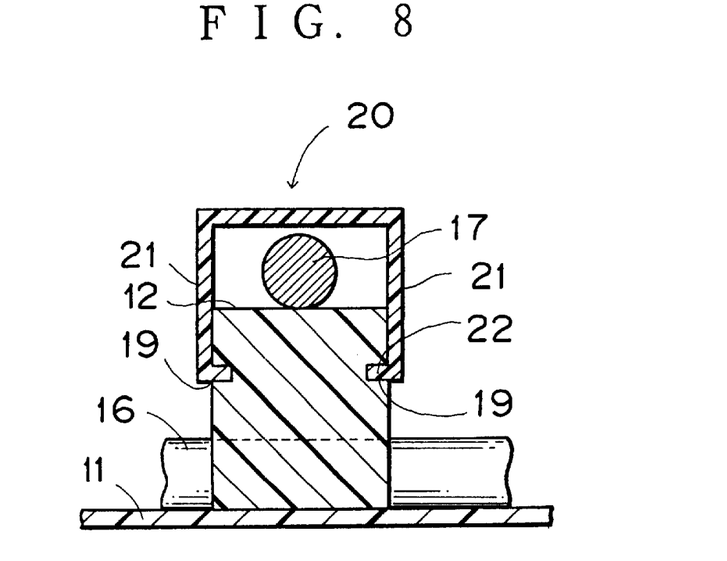
FIG. 8 is a cross section taken along C—C line in FIG. 7.

A stopper portion 23 of the spacer 20 moves in a direction of an arrow C shown in FIG. 7 when the attached spacer 20 abuts on the first wire 17.

With such a construction, after the first wire 17 and second wire 16 are disposed as described above, in such a manner that the spacer 20 covers the first wire 17 from a position thereabove, the spacer 20 is laid between a pair of the ribs 10 putting the first wire therebetween, then each engaging flange 22 is engaged with the respective engaging groove 19. Hence, the spacer 20 prevents the first wire 17 from coming off from the tops 12 of a pair of the ribs 10.

Since the engaging flange 22 is situated under the first wire 17, even if the second wire 16 comes off from the gap between the projections 15 and moves upward, the second wire 16 abuts on the engaging flange 22 and is prevented from moving additionally toward the first wire 17, thereby an insulating performance between both wires is securely attained.

The spacer is made of an insulative material such as rubber, wood and reclaimed paper. The spacer 20 is attached to a pair of the ribs in such a manner that the spacer 20 covers the first wire 17 from a position thereabove. However, the spacer 20 is not necessarily attached to a pair of the ribs in such a limited manner that the spacer 20 covers the first wire 17 from a position thereabove, provided that the spacer 20 can prevent both wires from contacting with each other any way.

Figure 9A:
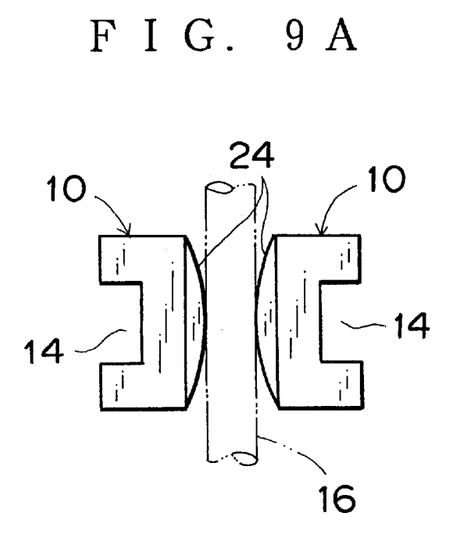
FIGS. 9A and 9B are top views illustrating a basic construction of an insulating support, wherein each rib has a respective modified projection.
Figure 9B:
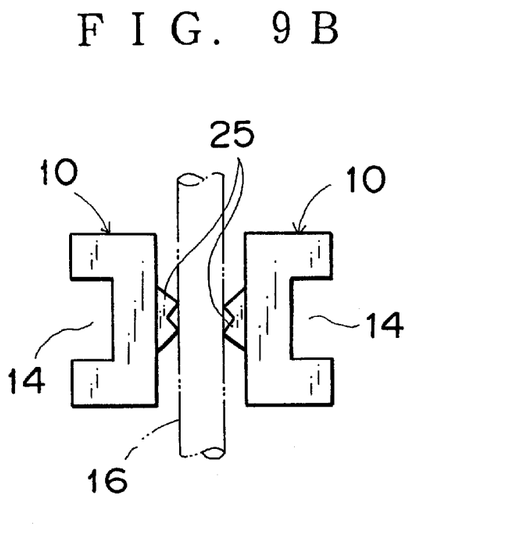

In the construction mentioned above, the projection 15 having a semicylindrical shape is formed approximately at the center of the lower half of the wall 13 as shown in FIG. 1, however, the projection may be a projection 24 formed throughout the full width of the wall 13 as shown in FIG. 9A in order to attain substantially the same effect with that of the above preferred embodiment. The projection may also be a projection 25 having a chevron shape instead of the semicylindrical shape as shown in FIG. 9B.

Figure 9C:
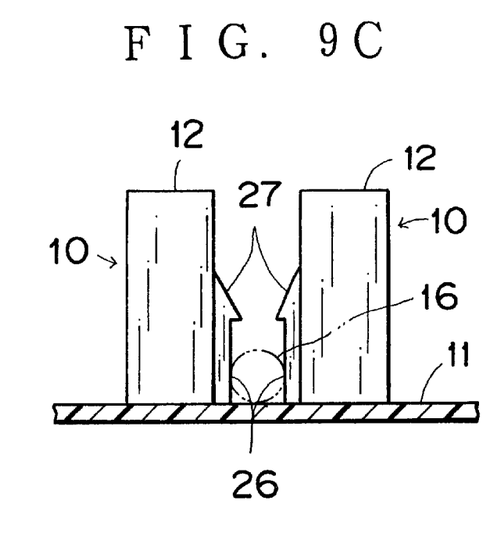
FIGS. 9C and 9D are side views illustrating a basic construction of an insulating support, wherein each rib has a respective modified projection.

Further, as shown in FIG. 9C, an upper end of a projection may be formed as a tapered portion 27 like an arrowhead, thereby the second wire 16 is easily press-fitted upon the wiring and the tapered portion 27 effectively prevents the press-fitted second wire 16 from coming off from the gap between the projections.

Figure 9D:
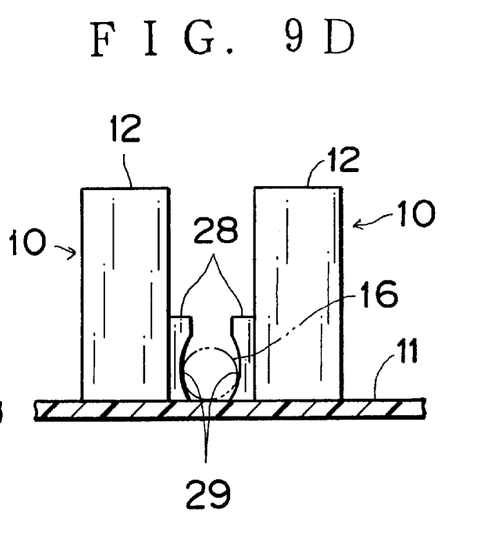

Furthermore, as shown in FIG. 9D, a curved hollow 29 may be formed for a projection 28 to securely prevent the second wire 16 from coming off from the gap between the projections.

In the preferred embodiments described above, the projection 15 is formed on the wall 13 of each rib 10, however, the projection 15 may be formed on the wall 13 of one rib 10 out of a pair of the ribs 10 instead.

Figure 10A:
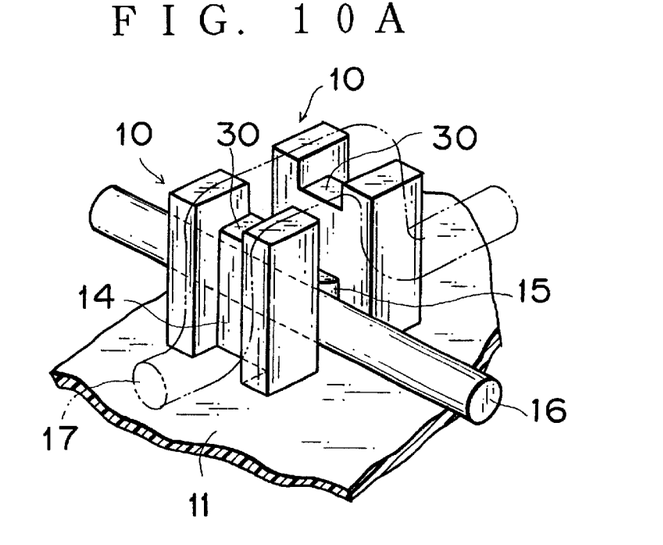
FIGS. 10A, 10B and 10C are expanded fragmentary perspective view illustrating a basic construction of an insulating support, wherein each rib has a respective modified guide channel.
Figure 10B:
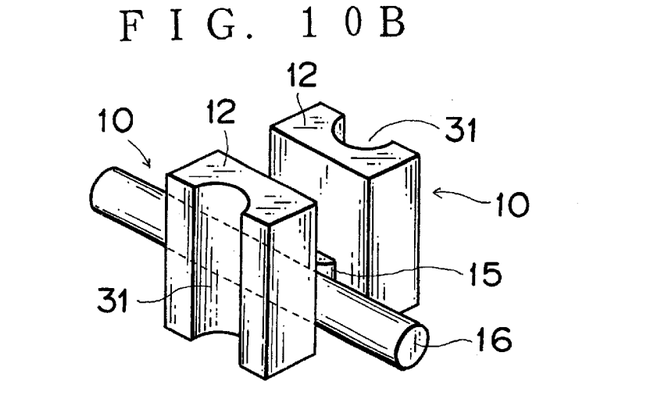
Figure 10C:
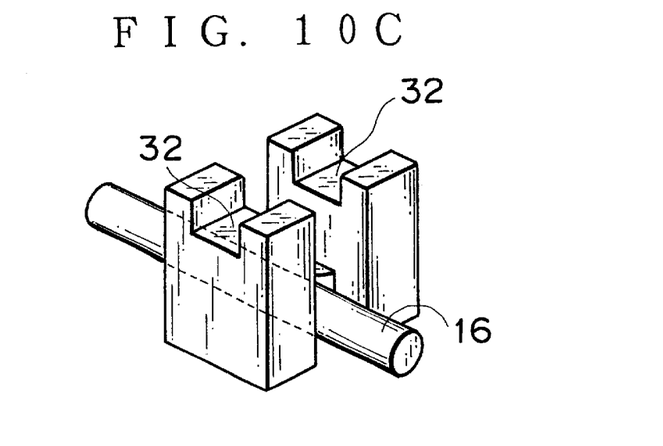

In the preferred embodiments described above, the guide channel 14 is formed on the opposite side of the wall 13 of the rib 10, however, a guide channel 14 may be formed in such a manner shown in FIGS. 10A to 10C. That is, as shown in FIG. 10A, a channel 30 connected with the guide channel 14 may be formed on the top 12 of the rib 10, thereby the displacement of the first wire 17 can be furthermore restrained and an insulating performance between the first wire 17 and the second wire 16 can be more securely attained since the first wire 17 can fit to the channel 30. As shown in FIG. 10B, the guide channel 14 may be replaced by a guide channel 31 having a round shape so that the first wire 17 can be in good tough with the guide channel 31, thereby the first wire 17 can be stably positioned to a pair of the ribs 10. As shown in FIG. 10C, a channel 32 may be formed only on the top 12 of the rib 10.

Figure 11A:
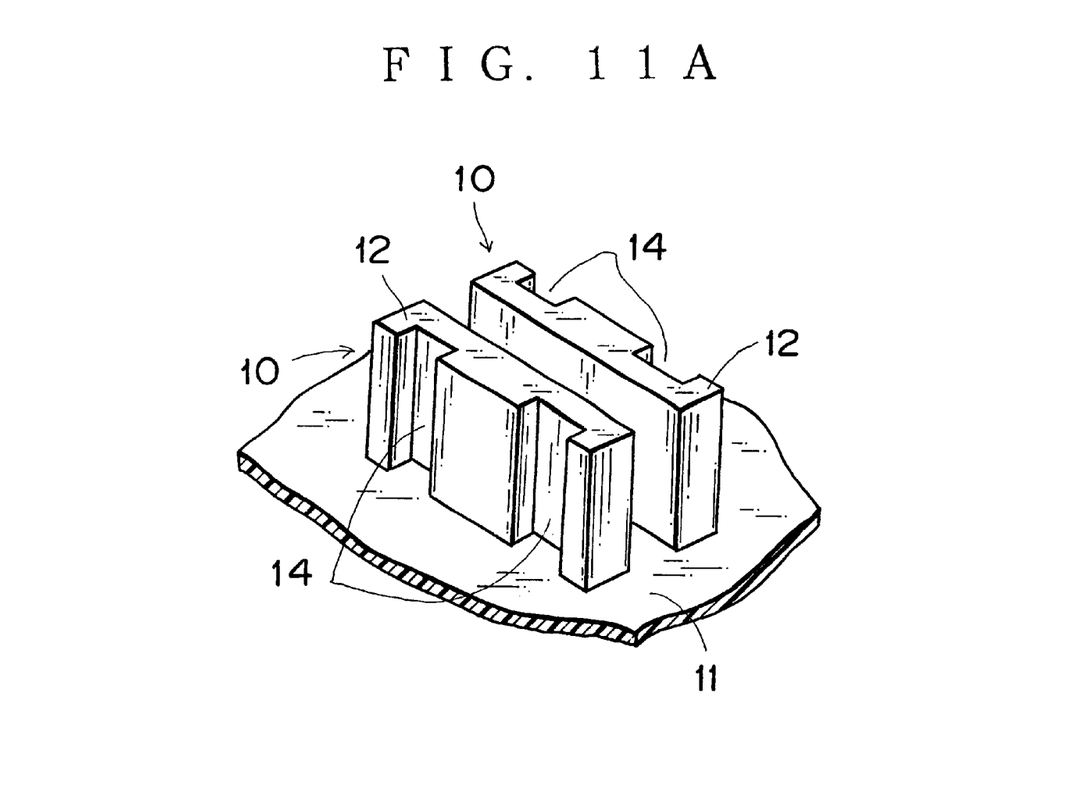
FIG. 11A is an expanded fragmentary perspective view illustrating a basic construction of an insulating support, wherein each rib has a modified shape.
Figure 11B:
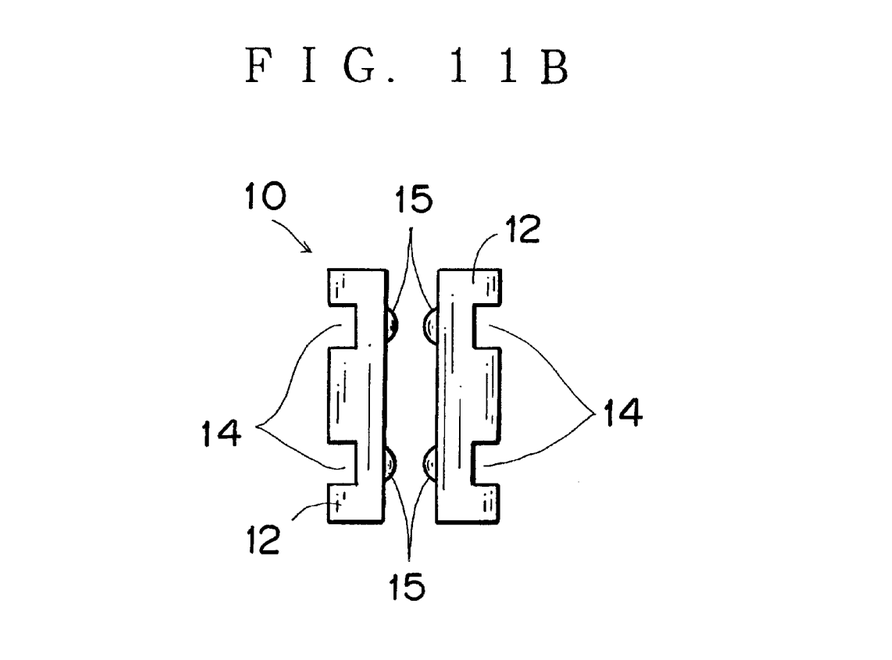
FIG. 11B is a top view of FIG. 11A.

In addition, as shown in FIGS. 11A and 11B, two or more guide channels 14 may be formed for each rib 10. In this case, the projection 15 may be formed in accordance with each guide channel 14 in number. The number of the projection 15 may be more than that or only one.

The insulating support of a junction box according to the present invention can be constructed by combining the various preferred embodiments described above.

In the preferred embodiments described above, the explanation is made on the assumption that the first wire 17 and second wire 16 are a bare wire and the like, however, the first and second wires are not limited thereto but may be a usual coated wire.

In addition, the rib 10 formed by molding into one body with the insulating support 11 can be applied to the boss 3 in the conventional insulating support. The insulating support of a junction box according to the present invention is not limited to use in vehicles, but can be applied to devices and the like for use in various industrial fields.

The aforementioned preferred embodiments are described to aid in understanding the present invention and variations may be made by one skilled in the art without departing from the spirit and scope of the present invention.

As explained above, the present invention is to provide an insulating support for wiring wires thereon of a junction box provided between a power supply and electric loads, comprising a pair of ribs formed on the insulating support for holding a first wire and a second wire therebetween, wherein the first wire laid between tops of a pair of the ribs is held crossing over the second wire disposed between a pair of the ribs (i.e. cross wiring). With this construction, the cross wiring can be implemented maintaining a good insulating performance between the wires without enlarging a size of the insulating support of a junction box, then the insulating support in which a great deal of wiring is carried out can be smoothly mounted on a limited space for mounting the same, thereby the space for mounting can be efficiently utilized.

Each rib has a respective wall faced with each other, a projection is formed on at least one of the walls, and the second wire is press-fitted and held between the projections or between the projection and the opposite wall. With this construction, the second wire can securely be held between a pair of the ribs and never comes off from the gap between the projections even if an external force or vibration is applied thereto, thereby a noise can be prevented from arising in the insulating support.

A guide channel is formed on each rib and the first wire to be positioned by the guide channel is laid between the tops of the rib. With this construction, the first wire is guided by the guide channel and disposed, thereby the wiring is easily implemented. In addition, the first wire is stably held without shifting by an impact, therefore, an insulating performance between the wires is improved.

Each projection is formed on the respective wall facing with each other, thereby the wiring can be easily implemented only by press fitting the second wire into the gap between both projections.

A spacer is laid between a pair of the ribs, thereby the spacer prevents the first and second wires from contacting with each other even if the second wire comes off from the gap between both projections.

The spacer is formed in such a manner that the first wire laid between the tops of a pair of the ribs can be held to said each rib, thereby the first wire is prevented from coming off from the tops of a pair of the ribs.

What is claimed is:

1. An insulating support for wires in a junction box provided between a power supply and electric loads, comprising a pair of ribs formed on the insulating support for holding a first wire and a second wire therebetween, wherein the first wire laid between tops of the pair of the ribs is held crossing over the second wire disposed between the pair of the ribs.

2. The insulating support according to claim 1, wherein each said rib has a respective wall faced with the other rib, a projection is formed on at least one of the walls, and the second wire is press-fitted and held between the projections or between the projection and the opposite wall.

3. The insulating support according to claim 2, wherein a guide channel is formed on each said rib and the first wire to be positioned by the guide channel is laid between the tops of each said rib.

4. The insulating support according to claim 3, wherein each said projection is formed on the respective wall facing with the other projection.

5. The insulating support according to claim 2, wherein each said projection is formed on the respective wall facing with the other projection.

6. The insulating support as defined in any one of claims 1–5, wherein a spacer is laid between the pair of the ribs so that the spacer prevents the first and second wires from contacting with each other.

7. The insulating support according to claim 6, wherein the spacer is formed in such a manner that the first wire laid between the tops of the pair of ribs can be held to each said rib.

* * * * *